Jan. 25, 1944.    S. H. GLEN    2,340,183
EYE FOR WIRE CABLES
Filed Jan. 29, 1943
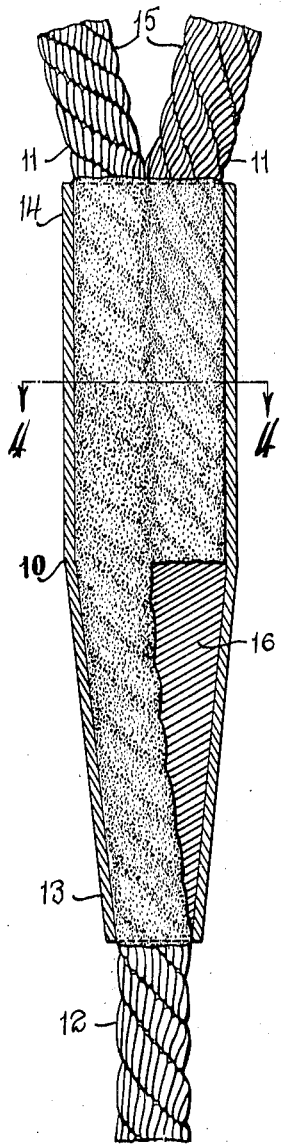
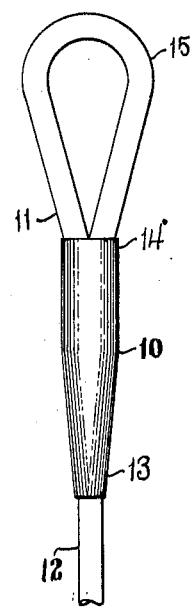
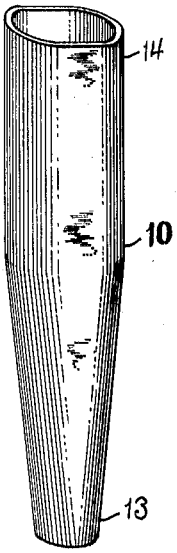
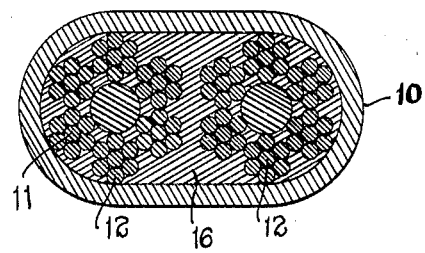
Inventor
Stewart H. Glen
By Seymour Earle Nichols
Attorneys Patented Jan. 25, 1944

2,340,183

UNITED STATES PATENT OFFICE 2,340,183

EYE FOR WIRE CABLES

Stewart H. Glen, Newport, R. I.

Application January 29, 1943, Serial No. 473,905

1 Claim. (Cl. 24—122.3)

This invention relates to an improvement in eyes for wire cables.

One object of the invention is to provide one end of a wire cable with an eye capable of withstanding the heavy strain often imposed upon wire cables.

Another object is to provide means for securing one end of a cable to an adjacent section of the cable to form an eye.

Still another object is to provide a ferrule to reinforce and complete the formation of an eye.

The invention consists in the construction and method hereinafter described and particularly recited in the claim.

In the accompanying drawing:

Fig. 1 is a face view of a cable formed with an eye, in accordance with my invention;

Fig. 2 is a view thereof in side elevation;

Fig. 3 is a broken sectional view taken on the line 3—3 of Fig. 2;

Fig. 4 is a transverse sectional view taken on the line 4—4 of Fig. 3; and

Fig. 5 is a perspective view of the ferrule.

In carrying out my invention, I employ a ferrule 10 having a tapered end and preferably formed of drawn or extruded metal. One end 11 of a cable 12 passes into the ferrule through its lower or smaller tapered end 13, and sufficient length is drawn out of the upper or larger end 14 to form a loop 15 of the desired size, and the end 11 is then inserted into the upper end 14 of the ferrule, which latter is then filled with solder 16, preferably zinc, to securely connect the adjacent surfaces of the cable together and to the ferrule, whereby an eye is formed capable of withstanding the great strain often imposed upon wire cables.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

The combination with a wire cable of a tapered ferrule having a single tapered passage through the smaller end of which one end of the cable is passed and looped, and into the larger end of which said end of the cable is inserted and solder in said ferrule connecting the adjacent surfaces of the cable together and to said ferrule.

STEWART H. GLEN.